United States Patent Office 3,467,194
Patented Sept. 16, 1969

3,467,194
STIMULATION OF PRODUCING WELLS WITH WATER-EXTERNAL MICELLAR DISPERSIONS
Wilson L. Kinney, Robinson, Ill., and Stanley C. Jones, Littleton, Colo., assignors to Marathon Oil Company, Findlay, Ohio, a corporation of Ohio
No Drawing. Filed Mar. 12, 1968, Ser. No. 712,343
Int. Cl. E21b 43/16
U.S. Cl. 166—305                                   16 Claims

ABSTRACT OF THE DISCLOSURE

Crude oil production from a producing means in fluid communication with an oil-bearing subterranean formation is improved by injecting into the producing means from about 0.5 to about 10 barrels of a water-external micellar dispersion per vertical foot of oil-bearing sand and then injecting sufficient crude oil into the sand to displace the micellar dispersion out into the reservoir, and thereafter returning the producing means to production. Such a process, inter alia, improves the relative permeability to crude oil in the area immediately adjacent to the well bore.

BACKGROUND OF THE INVENTION

Blair et al., in U.S. Patent No. 2,356,205 teaches that productivity of a producing well can be increased by removing wax-associated occlusions within the immediate vicinity of the well bore. This is accomplished by contacting the strata with a micellar solution, permitting the well to back flow and removing the objectionable components up-hole.

U.S. Patent No. 3,254,714, to Gogarty, et al. teaches a secondary-type recovery process wherein a micellar solution slug is injected into a petroleum reservoir and displaced toward a production well to recover crude oil therefrom. This process is especially effective in tertiary oil recovery.

Applicants have discovered that a miniscule amount of a water-external micellar dispersion can be used to increase the productivity of a production well. It is postulated that the relative permeability to oil is improved and such facilities the flow of crude oil to the well bore.

DESCRIPTION OF INVENTION

The micellar dispersions of this invention are water-external. However, the dispersions act like they are miscible both with the crude oil and connate water of the reservoir.

The term "micellar dispersion" as used herein is meant to include micellar solutions, water-external "microemulsions" [Schulman and Montagne, Annals of the New York Academy of Sciences, 92, pp. 366–371 (1961)], "transparent" emulsions, and micellar dispersion technology taught by C. G. Sumner, Clayton's, The Theory of Emulsions and Their Technical Treatment, 5th edition, pp. 315–320 (1954). Micellar dispersions differ from emulsions in many ways, the strongest differentiation being that the former are thermodynamically stable whereas the latter are not.

The micellar dispersion is composed essentially of hydrocarbon, an aqueous medium, a surfactant (e.g. petroleum sulfonate) sufficient to impart thermodynamic stability to the solution, semi-polar organic compound and optionally electrolyte. Examples of volume amounts are from 1% to about 50% hydrocarbon, from about 40% to about 95% aqueous medium, at least about 4% sulfonate, from about 0.01% to about 5% or more of semi-polar compound and up to about 4% or more by weight of electrolyte. In addition, the dispersion can contain corrosion inhibiting agents, bactericides, etc.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gases. Pure hydrocarbons are also useful, e.g., paraffin compounds including propane, pentane, heptane, decane, dodecane, etc.; cycloparaffins compounds including cyclohexane, etc.; aryl compounds including benzene, naphthalene, anthracene, etc.; alkylated products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft, brackish, or a brine. Preferably, the water is soft but it can contain small amounts of salts which are compatible with the ions in the subterranean formation being flooded.

Petroleum sulfonates (i.e. surfactants) useful with the micellar dispersion are also known as alkyl aryl naphthenic sulfonates. Such can be obtained by sulfonating at least a portion of a sulfonatable hydrocarbon (e.g., gas oils) and then neutralizing the mixture, e.g., with $NH_4OH$, $NaOH$, etc. The sulfonate can contain, e.g., 60–100% active sulfonate. Unsulfonated hydrocarbon within the sulfonates is useful as the hydrocarbon within this invention. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

The semi-polar organic compound (also known as co-surfactants and co-solubilizers) useful with the invention should have limited water solubility, e.g., from about 1% to about 20% at ambient temperature. Examples of semi-polar compounds include alcohols, amino compounds, esters, aldehydes and ketones containing from 1 up to about 20 or more carbon atoms and more preferably from 3 to about 16 carbon atoms. The semi-polar compound is preferably an alcohol, e.g., isopropanol, n- and isobutanol, the amyl alcohols including n-amyl alcohol, 1- and 2-hexanol, 1- and 2-octanol, decyl alcohols, alkaryl alcohols such as p-nonyl and alcoholic liquors such as fusel oil. Particularly useful alcohols include the primary butanols, primary pentanols and secondary hexanols. Concentrations of from about 0.01% to more than about 5 volume percent of the semi-polar compound is useful in the micellar dispersion and more preferably from about 0.2 to about 3%. Mixtures of two or more semi-polar compounds are useful in the micellar dispersions.

Electrolytes are useful within the water-external micellar dispersions. Examples of such electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in U.S. Patent No. 3,330,343. The type and concentration of electrolyte will depend on the aqueous medium, sulfonate, semi-polar organic compound, hydrocarbon and on the reservoir temperature.

The mobility of the water-external micellar dispersion is desirably about equal to or less than the mobility of the formation fluids (i.e., combination of crude oil and interstitial water).

The amount of the micellar dispersion injected into the well bore should be sufficient to displace substantially all the water in at least a 3 feet radius and up to about 20 feet in radius outwardly from the well bore. Generally, from about 0.5 to about 10 barrels of the dispersion per vertical foot of oil-bearing sand is sufficient to effect improved productivity of the producing well and preferably from about 1 to about 5 barrels give good results.

Preferably, the micellar dispersion is injected at a pressure less than the formation fracture pressure. After the micellar dispersion is injected into the reservoir, it can be immediately displaced into the reservoir by the hydrocarbon. Or, the dispersion can remain in contact with the oil-bearing sand immediately adjacent the well bore for up to about 12 hours or more to assure a more complete "water solubilization" or "take-up" of the formation water by the micellar dispersion. The latter is preferred where complete "water solubilization" by the dispersion is slow.

The hydrocarbon injected after the micellar dispersion to displace it out into the formation is preferably compatible with the crude oil being produced by the producing well. Preferably, it is crude oil and more preferably obtained from the existing production well. Preferably, the micellar dispersion is displaced by the hydrocarbon to a distance of at least about 20 feet outwardly from the well bore. The effect of this displacement, inter alia, is to improve the relative permeability to crude oil. Also, it is postulated that productivity adversities due to skin damage are overcome. Thus, the productivity index of the producing means is improved by this invention.

The connate water in the immediate vicinity of the well bore is dispersed outwardly into the reservoir in such a manner as to discount the adverse influence of water saturation on relative permeabilities to oil. Desirably, the area immediately adjacent the well bore is 100% saturated with oil after this invention is effected in the reservoir.

This invention is applicable to "watered-out" oil wells wherein high water saturation near the well bore decreases the relative permeability to oil and thus restricts oil productivity. After the invention is effected on the well, the near well bore relative permeabilities will encourage the flow of oil and discourage the flow of water.

Also, the invention is particularly applicable to producing wells in reservoirs having a gas drive or a remote active aquifer.

It is intended that the invention not be limited by the specific information contained herein. Rather, all equivalents in the particular art are intended to be incorporated within the invention as defined by the specification and appended claims.

What is claimed is:

1. A process of increasing the crude oil production from a producing means in fluid communcation with an oil-bearing subterranean formation, the process comprising:
    (1) injecting into the well bore of the producing means a water-external micellar dispersion in amounts sufficient to displace substantially all water from no more than the pore space adjacent the well bore to a distance of 3 to about 20 feet, then
    (2) injecting hydrocarbon into the pore space adjacent the well bore in amounts sufficient to displace outwardly the micellar dispersion into the formation, and thereafter
    (3) permitting the well to reproduce.

2. The process of claim 1 wherein the micellar dispersion is permitted to remain in the pore space adjacent the well bore for up to about 12 hours.

3. The process of claim 1 wherein from about 0.5 to about 10 barrels of micellar dispersion per vertical foot of oil-bearing sand is injected into the pore space.

4. The process of claim 1 wherein crude oil is injected in amounts sufficient to displace the micellar dispersion out into the formation to a distance beyond at least about 20 feet.

5. The process of claim 1 wherein the dispersion and hydrocarbon are injected into the formation at a pressure less than the formation fracture pressure.

6. A process of increasing the relative permeability to oil of sands adjacent a well bore in fluid communication with an oil-bearing subterranean formation, the process comprising injecting into the well bore a water-external micellar dispersion in amounts sufficient to displace substantially all water from no more than the pore space adjacent the well bore to a distance of 3 to about 20 feet and then injecting sufficient hydrocarbon in the well bore to displace the micellar dispersion out into the formation.

7. The process of claim 6 wherein the hydrocarbon is crude oil characteristic of the subterranean formation.

8. The process of claim 6 wherein 0.5 to about 10 barrels of micellar dispersion per vertical foot of oil-bearing sand is injected into the formation.

9. The process of claim 6 wherein the dispersion and hydrocarbon are injected into the reservoir at a pressure less than the formation fracture pressure.

10. The process of claim 6 wherein the dispersion is permitted to remain in contact with the sands adjacent the well bore for a period of time up to about 12 hours.

11. A process of increasing the productivity index of a producing well in fluid communication with an oil-bearing subterranean formation, the process comprising:
    (1) injecting into the oil-bearing sand from about 0.5 to about 10 barrels of a water-external micellar dispersion per vertical foot of oil-bearing sand, and
    (2) injecting hydrocarbon into the oil-bearing sand to displace the dispersion out into the formation.

12. The process of claim 11 wherein from about 1 to about 5 barrels of the dispersion per vertical foot of oil-bearing sand is injected.

13. The process of claim 11 wherein sufficient hydrocarbon is injected to displace the dispersion out into the formation to a distance beyond at least about 20 feet.

14. The process of claim 11 wherein the hydrocarbon is characteristic of the crude oil being produced from the producing well.

15. The process of claim 11 wherein the mobility of the dispersion is about equal to or less than the mobility of the formation fluids.

16. The process of claim 11 wherein the dispersion and hydrocarbon are injected at a pressure less than the formation fracture pressure.

References Cited

UNITED STATES PATENTS

| | | | |
|---|---|---|---|
| 2,356,205 | 8/1944 | Blair et al. | 252—8.55 |
| 2,356,254 | 8/1944 | Lehman et al. | 252—8.55 |
| 3,131,759 | 5/1964 | Slusser et al. | 166—2 |
| 3,149,673 | 9/1964 | Pennington | 166—42 |
| 3,185,217 | 5/1965 | Brooks et al. | 166—44 X |
| 3,208,517 | 9/1965 | Binder et al. | 166—9 |
| 3,254,714 | 6/1966 | Gogarty et al. | 166—9 |
| 3,266,570 | 8/1966 | Gogarty | 166—9 |
| 3,348,611 | 10/1967 | Reisberg | 166—9 |
| 3,373,809 | 3/1968 | Cooke | 166—9 |

STEPHEN J. NOVOSAD, Primary Examiner

UNITED STATES PATENT OFFICE
CERTIFICATE OF CORRECTION

Patent No. 3,467,194                           September 16, 1969

Wilson L. Kinney et al.

It is certified that error appears in the above identified patent and that said Letters Patent are hereby corrected as shown below:

Column 1, line 45, "facilities" should read -- facilitates --. Column 2, line 47, after "p-nonyl" insert -- phenol --.

Signed and sealed this 30th day of December 1969.

(SEAL)
Attest:

Edward M. Fletcher, Jr.                             WILLIAM E. SCHUYLER, JR.
Attesting Officer                                         Commissioner of Patents